(12) United States Patent
Obata

(10) Patent No.: US 6,301,509 B1
(45) Date of Patent: Oct. 9, 2001

(54) PROGRAMMABLE LOGIC CONTROL SYSTEM

(75) Inventor: Yoshimori Obata, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/148,693

(22) Filed: Sep. 4, 1998

(30) Foreign Application Priority Data

Sep. 8, 1997 (JP) .................................................. 9-242836

(51) Int. Cl.[7] .................................................. G05B 11/01
(52) U.S. Cl. .............................................. 700/11; 710/128
(58) Field of Search ............................... 700/11, 12, 18, 700/19, 20; 710/128, 126, 110, 120

(56) References Cited

U.S. PATENT DOCUMENTS

| | | | |
|---|---|---|---|
| 4,442,504 | 4/1984 | Dummermuth et al. | 710/264 |
| 4,870,564 | 9/1989 | Ketelhut et al. | 710/12 |
| 5,038,317 | 8/1991 | Callan et al. | 710/102 |
| 5,072,374 | 12/1991 | Sexton et al. | 709/208 |
| 5,146,401 | 9/1992 | Bansal et al. | 700/9 |
| 5,159,673 | * 10/1992 | Sackmann et al. | 709/216 |
| 5,162,986 | * 11/1992 | Graber et al. | 700/17 |
| 5,333,114 | 7/1994 | Warrior et al. | 700/67 |
| 5,432,711 | 7/1995 | Jackson et al. | 700/2 |
| 5,455,911 | * 10/1995 | Johansson | 710/44 |
| 5,472,347 | * 12/1995 | Nordenstrom et al. | 439/61 |
| 5,479,618 | * 12/1995 | Steeg et al. | 700/23 |
| 5,867,382 | * 2/1999 | McLaughlin | 700/17 |
| 5,912,814 | * 6/1999 | Flood | 700/2 |
| 6,073,053 | * 6/2000 | Dummermuth | 700/2 |
| 6,192,281 | * 2/2001 | Brown et al. | 700/2 |

* cited by examiner

Primary Examiner—Paul P. Gordon
Assistant Examiner—Zoila Cabrera
(74) Attorney, Agent, or Firm—Oblon, Spivak, McClelland, Maier & Neustadt, P.C.

(57) ABSTRACT

The invention is aimed at providing a programmable logic control system capable of executing a plurality of functions to realize high-speed data communication between itself and a control input/output unit without degrading the performance of the programmable logic control system, thereby significantly enhancing the performance and simplifying maintenance. To attain the aim, the programmable logic control system comprises a plurality of separate modules obtained by grouping the operating sections and the input/output sections of the controllers in the form of separate modules, and mounted on a back board. On the back board, there is also provided a control input/output unit connector. A signal is used for the control input/output unit connector connected parallel to the separate modules via the back board, so that communication can be performed, during use of a bus, between the separate modules and the control input/output unit.

7 Claims, 3 Drawing Sheets

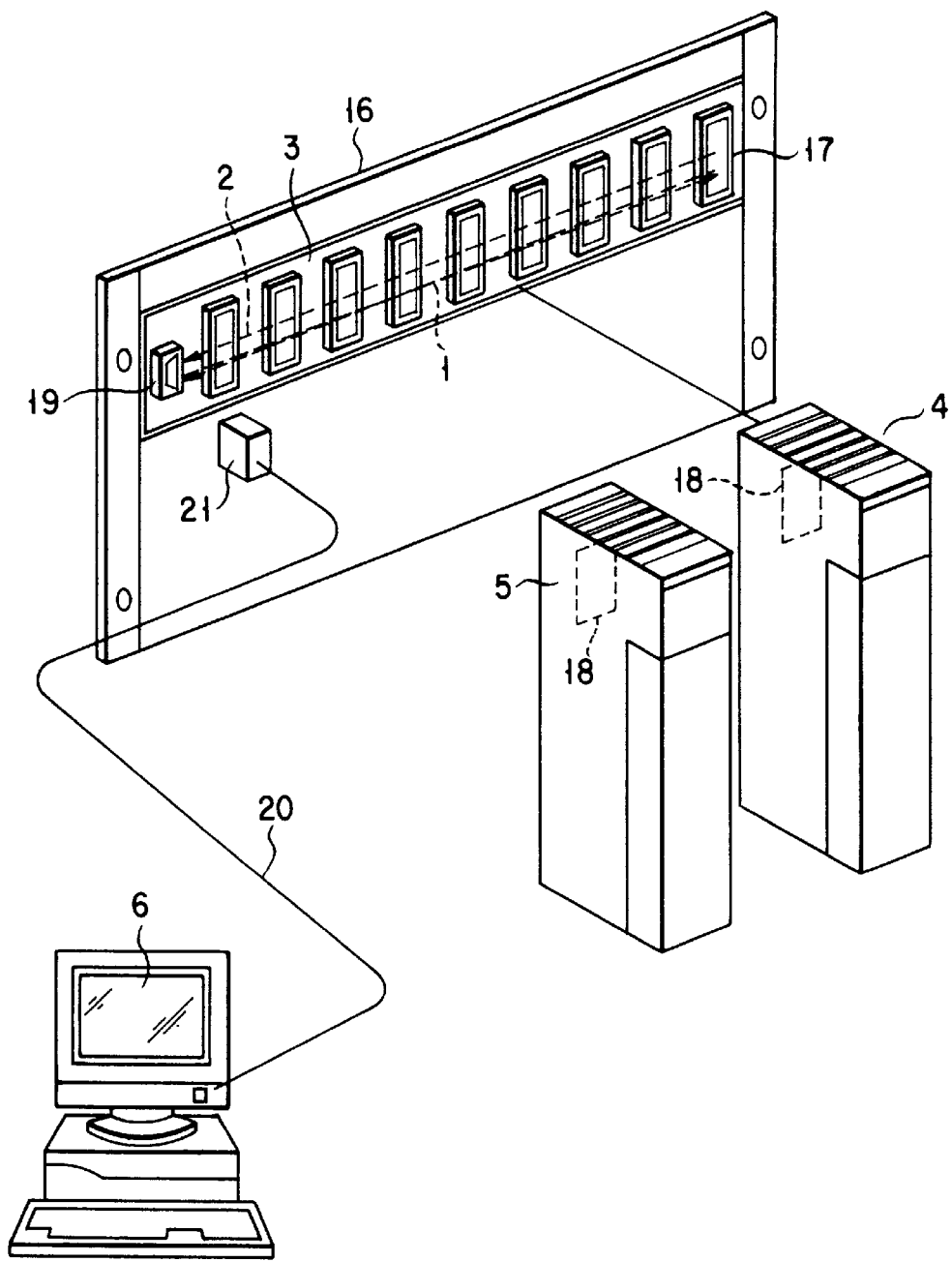
F I G. 1

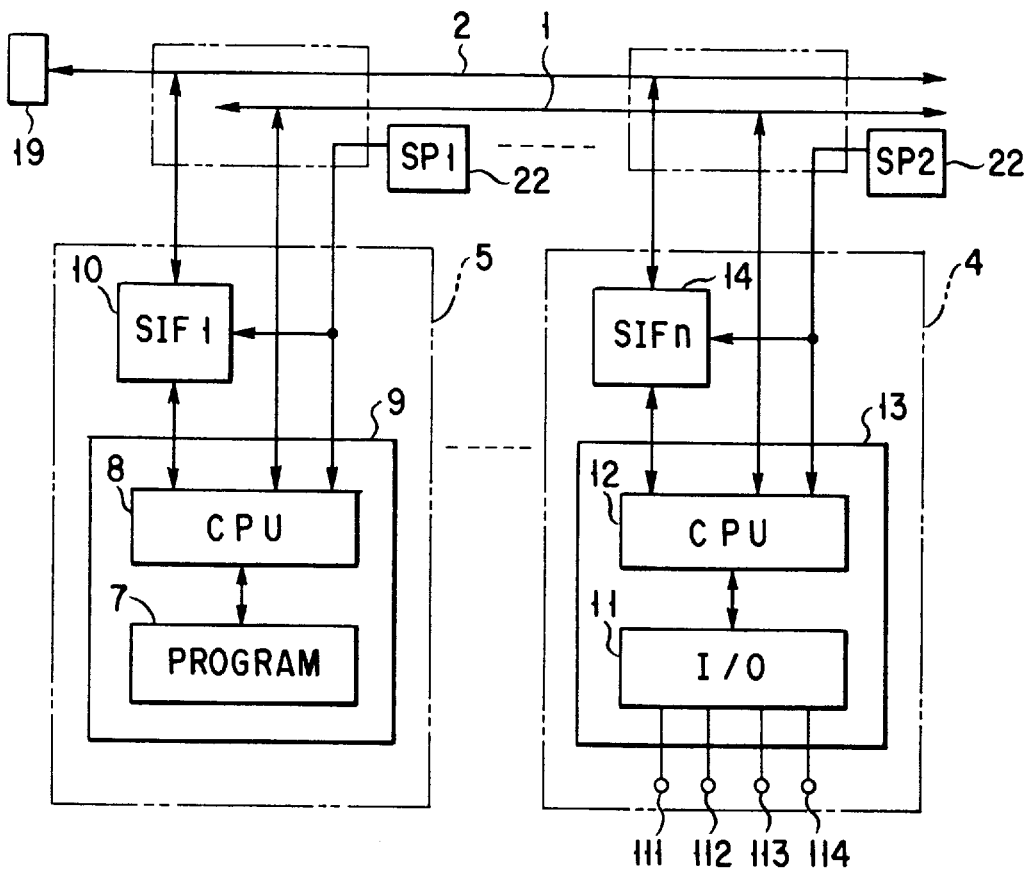
F I G. 2
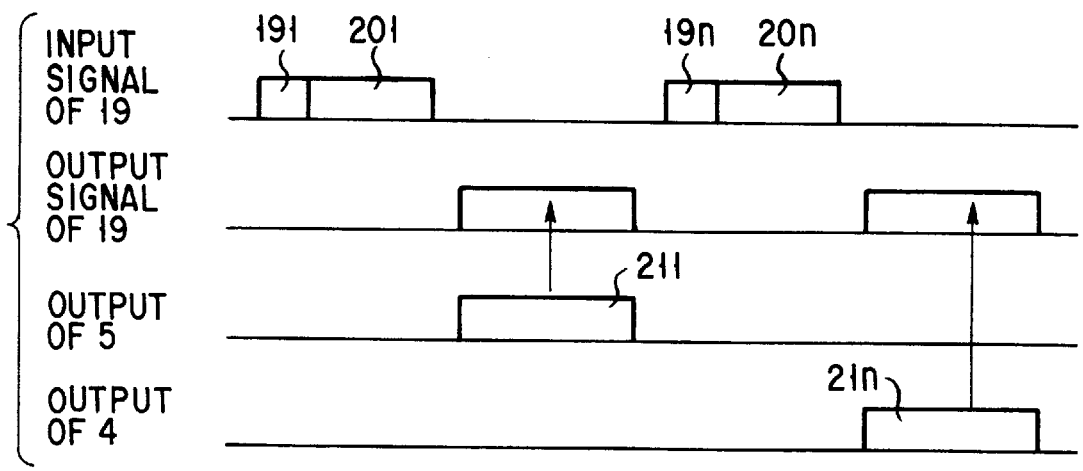
F I G. 3

PROGRAMMABLE LOGIC CONTROL SYSTEM

BACKGROUND OF THE INVENTION

This invention relates to a programmable logic control system (hereinafter referred to as a "PC"), and more particularly to a programmable logic control system in which a control command from a common control input/output unit is supplied to controllers incorporated in the programmable logic control system and having operation units and input/output sections, thereby controlling a plurality of objects connected to the input/output sections.

In general, programmable logic control systems PC each comprise central processing units (hereinafter referred to as "CPUs") and a plurality of input/output sections (hereinafter referred to as "I/O sections"). Programmable I/O sections, for example, which contain microprocessors and are highly functional, are more and more increasing.

Such highly functional I/O units are used to interface each peripheral unit, i.e. each control input/output unit, with at least one object via the CPU of the control input/output unit. In the case of I/O units which require special programming, they are generally provided with terminals to be connected to a special control input/output unit.

The conventional PC is generally connected to at least one object via the CPU of each control input/output unit. Therefore, the larger the number of highly functional I/O units and hence the greater the amount of information and the contents of processing, the greater the load on the CPU.

Moreover, where a plurality of I/O units which can be directly connected to an exclusive control input/output unit are used, it is also necessary to, for example, change the connection between the control input/output unit and the I/O units.

The CPUs of the conventional PC concentrically manage the interfacing function to interface control input/output units with objects. Since the amount of information to be controlled by the CPUs is more and more increasing these days, the load on the CPUs is accordingly increasing.

On the other hand, in the case of personal computers used as the control input/output units, a multi-task operation in which a plurality of processing or images are simultaneously treated has come to be widely performed in accordance with enhancement of hardware performance.

In light of the above, development of a programmable logic control system is now being desired, which enables control input/output units to execute a plurality of functions, without degrading the performance of the programmable logic control system, in order to perform high-speed data communication.

BRIEF SUMMARY OF THE INVENTION

It is the object of the invention to provide a programmable logic control system capable of executing a plurality of functions to realize high speed data communication between itself and a control input/output unit without degrading its performance, thereby significantly enhancing the performance and simplifying maintenance.

To attain the object, the invention according to claim 1 relates to a programmable logic control system for supplying control instructions output from a common control input/output unit, to controllers incorporated in the programmable logic control system and having operating sections and input/output sections, thereby controlling a plurality of objects connected to the input/output sections.

The programmable logic control system comprises: a plurality of separate input/output section modules obtained by grouping the operating sections and input/output sections in the form of separate modules, and connected parallel to a bus; at least one separate operating-section module corresponding to the operating sections of the controllers, and connected parallel to the bus; and a communication signal transmitting element which electrically connects the control input/output unit to each of the separate input/output section modules.

This structure enables communication between the control input/output unit and each separate module during use of the bus, with the result that high-speed data communication can be performed between each separate module and the control input/output unit without degrading the performance of the PC.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 1 is a perspective view, illustrating the manner of connection between a PC main body according to a first embodiment and a control input/output unit;

FIG. 2 is a block diagram, showing the PC main body of the first embodiment;

FIG. 3 is a view, useful in explaining a communication procedure employed in the FIG. 2 programmable logic control system;

DETAILED DESCRIPTION OF THE INVENTION

Figure 4:
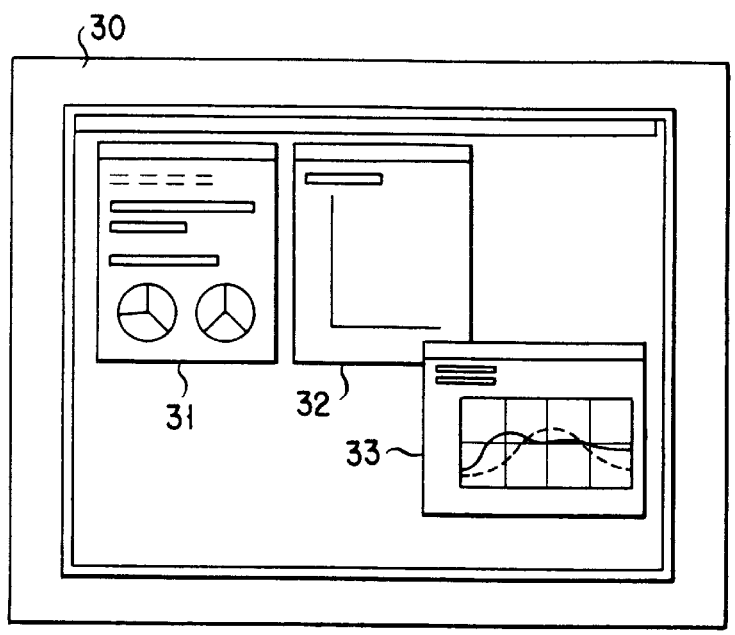
FIG. 4 is a view, showing the screen of the control input/output unit of FIG. 1.

The embodiment of the invention will be described with reference to the accompanying drawings.

<First Embodiment>

FIG. 1 is a perspective view, illustrating the manner of connection between a PC according to a first embodiment, i.e. a PC main body which will be described, and a control input/output unit 1 such as a personal computer. FIG. 2 is a block diagram, showing the PC main body of FIG. 1.

The PC according to the invention is constructed such that it supplies control instructions output from a common control input/output unit 6, to controllers incorporated in the PC and having CPUs and input/output (I/O) sections. Specifically, the PC supplies instructions from the common control input/output unit 6, to ports 111, 112, 113 and 114 of each input/output section 11 incorporated in the PC and shown in FIG. 2, thereby controlling a plurality of objects connected to the ports, such as a temperature control unit, a valve and a flow control unit.

The PC comprises a back board 3 formed of an attachment plate, such as a printed board, fixed to a base unit 16 and provided with a communication bus (hereinafter referred to as "bus 1") between modules and a communication signal bus 2 (hereinafter referred to as "a communication signal pattern "2"). These buses provide for communication between a control input/output unit 6 and separate modules. These modules can include a plurality of separate input/output section modules 4 (only one of the modules 4 is shown in the figure) obtained by grouping the input/output sections of the controllers in the form of separate modules, mounted on the back board 3 and connected electrically in parallel to the bus 1 and the communication signal pattern 2. There is also at least one separate operating-section module 5 connected electrically in parallel to the bus 1 and the communication signal pattern 2. The common control input/output unit 6 is a peripheral unit, an information processing computer, for example, which is connected electrically in parallel to the bus 1 and the communication signal pattern 2. Communication can be performed, during use of the bus 1, between each of the separate modules 4 and 5 and the control input/output unit 6 via the communication signal pattern 2.

The separate operating-section module 5 includes a memory 7 which stores control programs for controlling the objects, an internal inherent circuit 9 which consists of an operation unit (CPU) 8 for carrying out the control programs, and a serial communication circuit 10 interposed between the operation unit 8 and the communication signal pattern 2 for converting parallel signals output from the operation unit 8 to serial signals and imparting the serial signals to the control input/output unit 6.

Each separate input/output section module 4 includes an internal inherent circuit 13 which consists of at least one input/output section (input/output port) 11 (four input/output sections 11 in the FIG. 2 case) and an operation unit 12 for transmitting the input/output signals of the input/output section(s) to the communication signal pattern 2, and also includes a serial communication circuit 14 interposed between the module 4 side operation unit 12 and the communication signal pattern 2 for converting parallel signals output from the module-side operation unit 12 to serial signals and imparting the serial signals to the control input/output unit 6.

The electric connection between each separate module 4, 5 and the bus 1 and the communication signal pattern 2 of the back board 3 is realized by inserting module-side connectors 18 incorporated in the separate modules 4 and 5, into the back board 3 so that they will be connected to substrate-side connectors 17.

When the connectors 17 and 18 are disconnected, the modules and the bus 1 and pattern 2 of the back board 3 are disconnected.

The electric connection between the common control input/output unit 6 and the bus 1 and the communication signal pattern 2 of the back board 3 is realized by inserting, into the back board 3, an input/output side connector 21 connected to an electric cable 20 which is electrically connected to the control input/output unit 6, so that the connector 21 will be connected to a substrate-side control input/output unit connector 19 incorporated in the back board 3. When the connectors 19 and 21 are disconnected, the control input/output unit 6 and the bus 1 and pattern 2 of the back board 3 are disconnected.

Further, the connectors 17 of the back board 3 include address recognition means 22 for providing the input/output separate modules 4 with, for example, slot detection signals SP1 - SPn indicative of addresses corresponding to the mount positions of the modules 4, when the substrate-side module connecting connectors 17 are connected to the module-side connectors 18.

The address recognition means 22 may be modified such that they are located on the back board 3 in the vicinity of the connectors 17 and 18 which are provided corresponding to the separate input/output section modules 4, so that they will recognize the address of each separate module 4 from that signal just for detecting the mount position of the module, which indicates, for example, the manner of connection of a certain fixed pattern formed on the back board 3 or a switch mechanism provided thereon.

Since in the embodiment described above, the control input/output unit 6 is electrically connected to each separate input/output section module 4 and each separate operating-section module 5 via the communication signal pattern 2 formed on the back board 3, high-speed data communication can be performed between each separate module 4, 5 and the control input/output unit 6 without degrading the performance of the PC.

On the other hand, in the conventional PC, a connector to be connected to the control input/output unit 6 is provided for each separate module 4, and no communication pattern 2 as shown in FIGS. 1 and 2 for electrically connecting each connector and a corresponding separate module 4. Accordingly, the performance of the PC is degraded, high-speed data communication cannot be performed, and a plurality of functions cannot be executed.

FIG. 3 shows an example of a communication procedure assumed when request of data is issued from the control input/output unit 6 to the input/output separate modules 4. In the figure, the control input/output unit 6 side provides the control input/output unit connectors 19 with input signals which indicate addresses 191, . . . , 19n and data request commands 202, . . . , 20n.

The operation units 8 and 12 of the separate modules 4 and 5 compare the addresses 191, . . . , 19n with the addresses of the separate modules 4 and 5, and return response data 211, . . . , 21n of the modules 4 and 5. Accordingly, a single communication signal pattern 2 as a communication line can deal with a plurality of separate modules 4, and the CPU is not required to relate to all processing unlike the conventional case.

On the other hand, when the control input/output unit 6 is connected to the PC main body of the invention, it can take out any information from the separate modules 4 and 5 without degrading the performance of the PC, thereby providing high-speed response. Therefore, if a computer which can perform a multi-task operation is used as the control input/output unit, a plurality of information items concerning a CPU or a highly functional input/output section can be monitored at a time easily.

FIG. 4 shows examples of window images simultaneously displayed when a computer capable of performing a multi-task operation is used as the control input/output unit. In FIG. 4, reference numeral 30 denotes a control input/output unit display, on which monitor information items 31, 32 and 33 based on data from the PC main body are displayed. Monitor information 31 concerns circle graphs corresponding to equipment's names, monitor information 32 a graph corresponding to the equipment's names, and monitor information 33 a trend corresponding to them.

Even if quite different information items are displayed in combination in the window, they can be obtained from a single communication line without being influenced by the performance limitation of the PC main body due to its CPU.

Accordingly, a single control input/output unit 6 can be used commonly for all the operation units CPU and the input/output (I/O) units of the separate modules.

<Another Embodiment>

Figure 5:
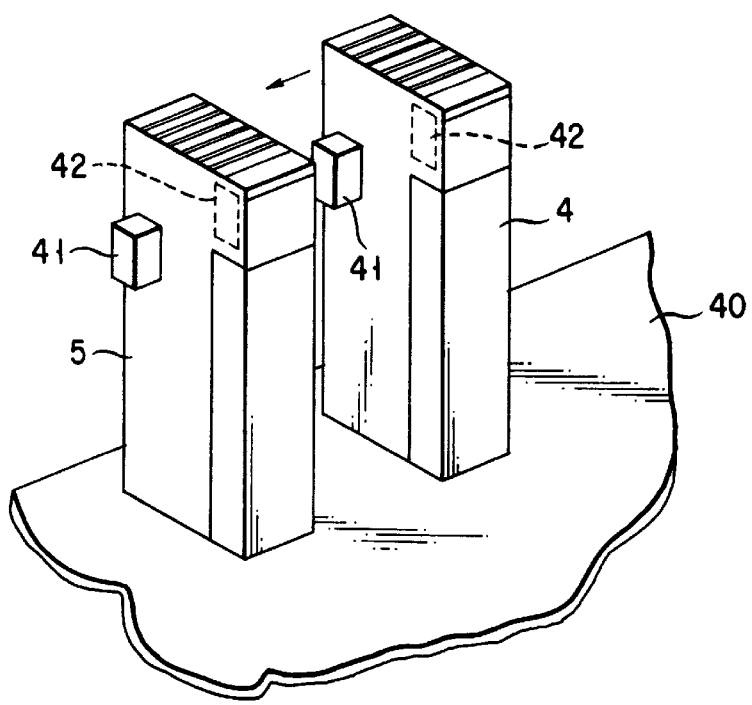
FIG. 5 is a perspective view, useful in explaining an essential part of a second embodiment of the invention.

Although in the above-described embodiment, the separate modules 4 and 5 are mounted on the back board 3 fixed to the base 16, the base 16 and back board 3 may be omitted and the PC be constructed as follows:

As shown in FIG. 5, the separate modules 4 and 5 are directly fixed on an object 40, a male connector 41 and a female connector 42 are attached to each separate module 4, 5, and the male and female connectors 41 and 42 attached to adjacent surfaces of the separate modules 4 and 5 are connected to each other.

Moreover, in the FIG. 5 case, a communication signal transmission plate or line and a bus plate or line, for example, may be used in place of the male and female connectors 41 and 42.

In addition, in FIGS. 1 and 2, a communication signal transmission plate may be used instead of the communication signal pattern 2.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A programmable logic control system to be connected to a computer, the system comprising:

at least one input/output module including at least one port connected to at least one target device to be controlled;

at least one processor module configured to control said at least one target device;

a communication bus electrically connected in parallel to said at least one input/output module and to said at least one processor module; and a communication signal bus electrically connected in parallel to said at least one input/output module and said at least one processor module, wherein at least one of said at least one input/output module and said at least one processor module is connected to said computer by at least said communication signal bus.

2. The programmable logic control system according to claim 1, further comprising:

a first serial communication circuit connected to said at least one input/output module and said communication signal bus; and a second serial communication circuit connected to said at least one processor module and said communication signal bus.

3. The programmable logic control system according to claim 1, further comprising a mount board including a plurality of connectors for said at least one input/output module or said at least one processor module, said communication bus and said communication signal bus being provided on the mount board.

4. The programmable logic control system according to claim 3, wherein said mount board further comprises address recognition means for allocating addresses of said plurality of connectors to said at least one input/output module or said at least one processor module.

5. The programmable logic control system according to claim 4, wherein said computer displays a state of said at least one target device connected to said at least one input/output module designated by said address recognition means, and wherein when said computer is connected to two or more target devices to be controlled, said computer simultaneously displays states of at least two of said target devices to be controlled.

6. The programmable logic control system according to claim 1, wherein said communication bus further comprises a computer connector for detachably connecting said computer with said communication bus.

7. The programmable logic control system according to claim 1, wherein said at least one input/output module comprises a first connector and a second connector which connect a portion of said communication bus and a portion of said communication signal bus to said at least one input/output module, wherein said processor module further comprises a third connector and a fourth connector which connect a portion of said communication bus and a portion of said communication signal bus to said at least one input/output module and wherein said first and second connectors, said third and fourth connectors, said first and fourth connectors, and said third and fourth connectors are electrically connectable.

* * * * *